United States Patent [19]

Havenstein, deceased et al.

[11] Patent Number: 5,374,445
[45] Date of Patent: Dec. 20, 1994

[54] EDIBLE SPREADS AND PROCESS OF MAKING

[75] Inventors: Alfred Havenstein, deceased, late of Schenefeld, by Maria Havenstein nee Tiemann, heiress; Axel Huffziger, Ulm, both of Germany

[73] Assignee: Van Den Bergh Foods Co., Division of Conopco Inc., Lisle, Ill.

[21] Appl. No.: 978,596

[22] Filed: Nov. 19, 1992

Related U.S. Application Data

[63] Continuation-in-part of Ser. No. 592,091, Oct. 3, 1990, abandoned.

[30] Foreign Application Priority Data

Oct. 9, 1989 [GB] United Kingdom ............... 8922718
Mar. 1, 1990 [GB] United Kingdom ............... 9004615
May 4, 1990 [GB] United Kingdom ............... 9010131

[51] Int. Cl.$^5$ ............................................. A23D 7/00
[52] U.S. Cl. ................................. 426/603; 426/602; 426/604; 426/663
[58] Field of Search ............... 426/602, 603, 604, 663

[56] References Cited

U.S. PATENT DOCUMENTS 3,386,835  6/1968  Schaap ........................... 426/603
4,888,197  12/1989  Wieske ........................... 426/603

*Primary Examiner*—Helen Pratt
*Attorney, Agent, or Firm*—Cushman, Darby & Cushman

[57] ABSTRACT

The invention provides reduced fat spread products which do not contain either preservatives or emulsifiers have acceptable organoleptic properties and to processes of preparing same. These are edible emulsions comprising a dispersion of a 15-60% wt. of a water phase in 40-85% wt. of a continuous fat phase CHARACTERIZED IN THAT the water phase contains less than 0.05% protein, has a D3,3 not more than 2.0 μm and a sigma value for the water drop size distribution of not more than 2.5. In preferred embodiments the spreads are stable in the absence of an emulsifier system but may contain an emulsifier as an anti-spattering agent.

18 Claims, 2 Drawing Sheets

EDIBLE SPREADS AND PROCESS OF MAKING

This application is a continuation-in-part of U.S. Ser. No. 07/592,091, filed Oct. 2, 1990 now abandoned.

FIELD OF THE INVENTION

The present invention relates to edible spreads, their processing and to an apparatus for carrying out this process.

BACKGROUND OF THE INVENTION

Edible fats are emulsified with water-phases to form edible spreads. In margarine and other non-dairy spread production, formation of the emulsion is accomplished by cooling and working of a process stream containing both fat and water. It is commonplace to pasteurize this process stream before cooling and working.

While fat and water are the principal components of edible spreads other components (such as emulsifiers, thickeners, preservatives and anti-spattering agents), as are mentioned below, are included in product formulations to manipulate product properties both in the final product and during processing.

It is commonplace to use "Votator" (RTM) units to work and cool the process stream in edible fat processing. These Votator units include two distinct types of units known as "A-units" and "C-units".

A-units, which are scraped-surface heat-exchangers, serve both to cool and crystallize an emulsion. C-units, which are pin-stirrers, are also used for crystallization but can apply sufficient shear to induce phase inversion of a oil in water emulsion or transformation of a premix to a water-in-oil dispersion. In spread manufacture by the phase-inversion process, it is commonplace to separate the cooling and inversion steps, such that cooling occurs in one or more A-units in line, prior to a C-unit which functions as a phase invertor; thereby converting an oil-in-water process stream to a water-in-oil spread.

Spreads are characterized by a wide range of physical product properties and organoleptic properties. Some of these properties are more important than others in consumer acceptance. In particular, good spreadability, keepability at ambient temperature, second place keepability consistency both at storage and room temperature, mouth meltdown and oil-retention are important properties.

Keepability is known to be influenced by the water droplet distribution and water phase contents. Coarse emulsions containing bacterial and mold nutrients, such as proteins, generally have poor keepability. Fine emulsions are resistant to bacterial spoilage but are still succeptable to mold growth. Water phase distribution is influenced by processing conditions. Keepability can be improved markedly by cold-distribution and cold-storage, but this is not always practical.

Keepability can also be improved by reducing the nutrient content or incorporating microbial growth inhibitors (such as salts and/or acids) in the product. However, reduction of protein content generally results in poor organoleptic properties and can influence processability of the emulsion. The use of preservatives, particularly substances such as potassium sorbate is commonplace, but is not acceptable to some groups of consumers. While it is therefore known that both product composition and process conditions can influence the water-phase distribution, limited success has been enjoyed in the search for a combination of process conditions and product components which enable the manufacture of acceptable products of high physical and microbiological stability but with a very simple formulation.

While fat and water are the principal components of edible spreads, other components (such as emulsifiers, thickeners, preservatives and anti-spattering agents), as are mentioned below, are included in product formulations to manipulate product properties both in the final product and during processing. The first cooling and shearing unit is preferably at least one scraped surface heat exchanger, preferably an "A-unit" for cooling the process stream to the homogenizer input temperature and forming a fat-continuous emulsion with low but non-zero solids content. It is believed that the presence of the cooling and shearing unit is important to ensure that the feed into the homogenizer is fat-continuous and contains a small amount of solid fat.

Preferably the homogenizer means comprise a two step in line homogenizer. It is convenient that the homogenizer should include a high pressure pump. We have found that an "APV Gaulin 300 series two step homogenizer" is suitable although a booster pump may be needed to supply product if the homogenizer is alone incapable of drawing the feedstock from a source. A minor advantage of using a homogenizer with a high pressure pump is that no dosing pump is required.

As a first alternative a homogenizer valve may be employed, "in line".

As a second alternative other homogenizer means such as Jet or other high speed mixers may be employed. The object of the homogenizer means being to prepare a fine emulsion and the apparatus employed not being limited to the homogenizer per se.

BRIEF DESCRIPTION OF THE DRAWINGS

In order that the present invention may be further understood, it will be elaborated upon hereafter by means of example and with reference to the accompanying figures, wherein.

DETAILED DESCRIPTION OF PREFERRED EMBODIMENTS

Figure 1A:
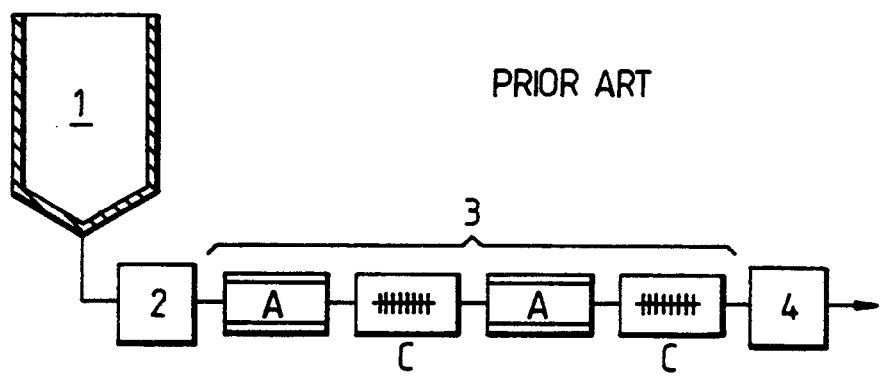
FIG. 1: shows in schematic form, a spread production line according to the present invention (FIG. 1B) and a spread production line according to the prior art (FIG. 1A).

Our invention provides reduced fat spread products which do not contain preservatives and which have acceptable organoleptic properties.

According to one aspect of the present invention there is provided an edible emulsion comprising a dispersion of a 15–60% wt. of a water phase in 40–85% wt. of a continuous fat phase wherein the water phase contains less than 0.05% protein, has a D 3, 3 not more than 2.0 $\mu$m and a sigma value for the water drop size distribution of not more than 2.5.

The term D 3, 3 refers to a volume weighted geometric mean diameter as discussed in Part. Syst. Charact. 8/91, pp. 237–241 by M. Alderliesten. Sigma value is an alternative term for standard deviation.

N-line is a line created from a collection of points each indicating a solid fat content in a fat sample over a certain range of temperatures. $N_{10}$ is the percentage of solid fat in a fat at a temperature of 10° C. Fette-Seifen-Anstrichmettel 1978, 80, 180–186 (enclosed).

While the fat content of emulsions according to the present invention may range from 40% (halvarines) to 85% (margarines), particularly good results are obtained when products are prepared with 50–70% fat. These "reduced fat spreads" are multifunctional in that they may be used in cooking for shallow frying and as spreads. The most preferred fat level for reduced fat spreads is around 60% fat.

Typically, the product water-phase further comprises a non-proteinaceous emulsifier system. Suitable emulsifiers are lecithin, monoglycerides and mixtures of one or more lecithins and one or more monoglycerides. The combination of both lecithins and monoglycerides results in stable products with a good, creamy consistency. The presence of these emulsifiers in the products of the present invention reduces oil exudation and improves so-called "second place keep-ability", at temperatures up to 25° C. Preferably, the emulsifier system is present at concentrations of 0.1–0.5%.

As mentioned below, spreads according to the present invention are stable in the absence of an emulsifier system. Thus, the emulsifier component is optional.

Products can contain salt, at a concentration of up to 2%. Salt is present for organoleptic reasons rather than as a preservative. In preferred embodiments the salt content is below 0.2%.

It is commonplace in edible spreads production to use lactic or citric acids to establish the desired pH. The quantities of these ingredients required is to some extent determined by the protein content, as the presence of protein buffers the pH and demands the addition of either stronger acids or larger amounts of weak acids. Sorbic acid (as potassium sorbate) is commonly used as a preservative in edible spreads.

We have determined that in the absence of protein and other strong buffering agents such as sorbate, the water phase pH can be established by the presence of low levels of ascorbate ions (vitamin C). With this composition pH values of 4.2–7.0 are accessible. Preferred pH values are in the range 4.6–5.2. Other vitamins (particularly A and E) may be added as is conventional in margarine and other spread production.

Accordingly a further aspect of the present invention provides an edible spread which is substantially free of protein and which contains 0.0001–0.1% ascorbic acid.

Preferably, the edible spreads according to the present invention have a rather simple formulation and comprise vegetable fat, water, at least one non-proteinaceous emulsifier (preferably lecithin), ascorbic acid, vitamin A and vitamin E. It is observed that these particular formulations are free of both sorbic and lactic acids.

The fat phase N-line should preferably be as given in the following table, in which the first column gives a broad acceptable range and the second column a particularly preferred range.

| | | |
|---|---|---|
| N10 | 25–40 | 29–31 |
| N15 | 22–30 | 22–24 |
| N20 | 14–21 | 14–16 |
| N25 | 8–12 | 8–10 |
| N30 | <6 | 2–4 |

-continued

| | | |
|---|---|---|
| N35 | <2 | close to 0 |

Within the constraints of these physical properties considerable variation of fat phase composition is possible. Such variations enable both the production of both products suitable for packing in tubs or products suitable for packing in a wrapper. The use of vegetable fats is preferred due to their low content of saturated fatty acids, however the use of animal fats, such as butterfat and tallow is envisaged. In particular embodiments of the present invention, the fat phase comprises at least one liquid oil and at least one interesterified blend of palm and other vegetable oils. It is also envisaged that simple non-hydrogenated and/or single component fat phases such as "high stearic" vegetable oils may be employed.

It is preferred that the vegetable fat employed should have a low level of trans fatty acids. This can be ensured by suitable selection of the fat phase.

The use of fat-replacers instead of a portion of the fat blend is not excluded. It is envisaged that the so-called sucrose fatty acid esters may replace some or all of the tri-glyceride fat phase of the spreads according to the present invention.

Quite surprisingly, we have determined that the products of the present invention may be manufactured without added emulsifiers while retaining many of the spreading and second place keepability benefits of the invention. This further reduces the number of ingredients which must be included in the product.

Accordingly a further aspect of the present invention provides an edible emulsion spread comprising a dispersion of a 15–60% wt. of a water phase in 40–85% wt. of a continuous fat phase CHARACTERIZED IN THAT the spread is stable in the absence of emulsifier, and the water phase has a D 3, 3 not more than 2.0 μm and a standard deviation below 2. Preferably, the fat content is 50–70% and in the most preferred embodiments around 60%.

Typically, a known emulsifier such as lecithin may be incorporated into the formulation as an anti-spattering agent. Accordingly, a further aspect of the present invention provides for the use of an emulsifier as an anti-spattering agent in an edible emulsion spread which is stable in the absence of an emulsifier component.

In the most preferred embodiments of the present invention, spreads have a rather simple basic formulation which comprises a vegetable fat (preferably a low or zero trans vegetable fat), water, and at least one non-proteinaceous anti-spattering agent (preferably lecithin). Other minor components such as salt and color will generally be present. It is observed that these particular formulations are free of both emulsifier (as such) and preservative.

The further cooling and shearing units are elaborated upon below.

Described in terms of process aspects, a significant feature of the present invention is that it includes the particular process step of homogenizing a fat-continuous emulsion.

Accordingly a further (process) aspect of the present invention provides a process for the production of an edible spread which comprises the steps of;
a) forming a coarse fat-continuous dispersion of water-in-oil with a solid fat index of 0.5–2.5%;
b) homogenizing the product of step (a), and, c) working and cooling the product of step (b) to obtain a spread.

Preferably homogenization is performed in a two stage homogenizer with a first step pressure drop of 20-50 bar. Preferably the second step pressure drop is also 20-50 bar, We have determined that with apparatus as is commonly available in spread production plants, the optimum pressure drop is 35 bar per step for the two-step homogenizer. The process can also be performed with a one step homogenization in which case a 30-40 bar pressure drop was found optimal.

Preferably the homogenization temperature ranges from 20°-35° C., more preferably the temperature ranges from 28°-32° C. We have observed that with the apparatus used, the homogenization temperature is quite critical and it is important, with the particular apparatus used, that the temperature does not exceed 35° C.

The homogenization process step can be conducted in batch or carried out continuously. A continuous process is preferred with a short distance to the next cooling and working group so as to reduce phase separation during process stream flow.

It is believed that homogenization of the coarse, substantially protein-free premix prior to working and cooling (typically to be carried out in a conventional spread production process) results in a final emulsion which has an acceptable microbiological stability at ambient temperature and is as organoleptically acceptable as products containing proteins.

While not wishing to be limited by any theory, it is also believed that cooling of the premix to homogenization temperature produces preferably 1-2% of so-called 'alpha' crystals in the process stream more preferably 1.2-1.4%. Homogenization of the premix disperses these crystals widely through the product providing many crystal seeds to initiate later crystallization, leading to a homogeneous final structure. In the methods of the prior art there is a lesser distribution of these alpha-crystals and as a consequence crystal growth proceeds from fewer loci giving a coarser structure in the product.

In embodiments of the invention, the cooling and working units following the homogenizer are of the conventional A- and C-unit types. Preferably, these comprise an ACAC sequence. This is a known sequence of working and cooling units.

It is preferable that the first of these units (an A-unit) should cool the process stream to below 25° C., and preferably to a temperature of around 18°-20° C.

The second unit (a C-unit) is a working unit. We have determined that with the homogenized fat-continuous premix of the present invention the shear conditions in this unit may vary within wide limits with little effect on the drop size.

The exit temperature of the second cooling unit of the ACAC sequence, that is the second A-unit (A3), should be as low as is practical. In preferred embodiments of the invention the process stream temperature should not exceed 19° C., and preferably be in the range 18°-12° C. (See FIG. 3).

In embodiments of the invention the last C-unit should work the product only to a small extent. With conventional equipment we have determined that this unit should operate at around 100-200 rpm so as to minimize overworking of the product.

Similarly, in embodiments of the present invention the packaging machine should also be selected such that working of the product is kept to a minimum so as to ensure that water drop coalescence is substantially prevented and the emulsion remains fine.

EXAMPLES

For comparative purposes FIG. 1A illustrates the method and apparatus of the present invention in schematic form as compared with a method of the prior art. Service circuits have been omitted from the diagram for the sake of clarity.

In the method of the prior art (FIG. 1a) a premix is prepared in tank (1), Pasteurized in a heating unit (2) and fed into VOTATOR line (3). A conventional VOTATOR line consists of A units and C-units, and it is not uncommon for these to be arranged in an ACAC sequence. Product emerges from the end of the line into packing machine (4).

EXAMPLE 1: THE GENERAL PROCESS

Figure 1B:
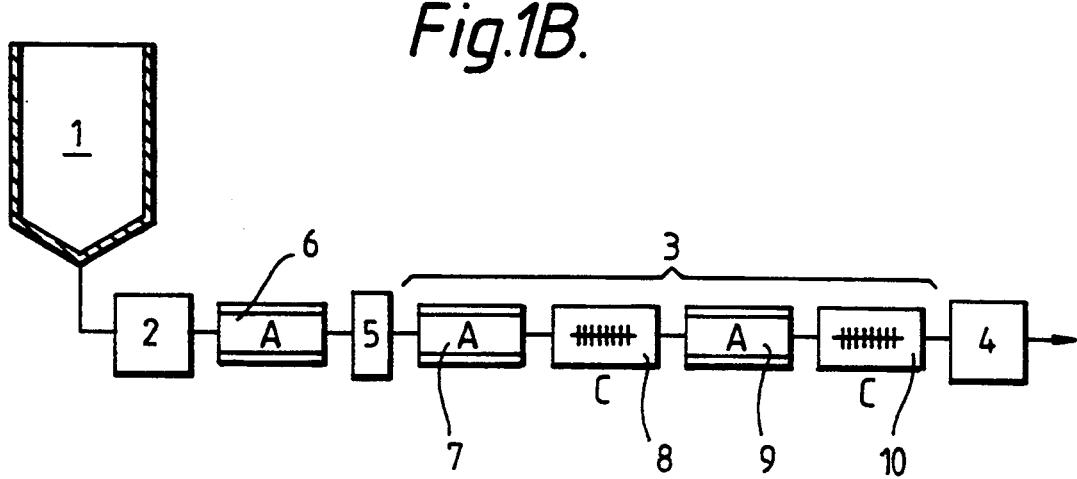

Turning to FIG. 1B it can be seen that the apparatus according to the present invention is similar to that given in the comparative FIG. 1A. The same reference numerals have been used throughout. However a further VOTATOR A-unit (6) and a homogenizer (5) have been inserted into the process line.

In order to make a product according to the present invention premix was made up with the following formulation and processed according to the method given below. Here, as throughout the specification, all percentages are expressed in terms of weight.

| Fat Blend | 59.55% | |
|---|---|---|
| Hymono 8803 | 00.15% | (emulsifier) |
| Hymono 7804 | 00.10% | (emulsifier) |
| Bolec CM | 00.20% | (emulsifier) |
| NaCl | 00.15% | |
| β-Carotene | 15 ppm | (color) |
| H&R 53967 | 670 ppm | (flavor) |
| Water | 39.86% | |

The premix was prepared by mixing together all the ingredients in a thermostated tank (1) at 58°-61° C. The premix was drawn from the tank with a booster pump (not shown) at a rate of 106 kg/hr and fed into an Votator (RTM) A-unit (6) with an process stream exit temperature of 16° C. and a service stream (liquid ammonia coolant) temperature of −20° C. From the A-unit, the product was fed into an APV Gaulin 300 series two-stage homogenizer (5) equipped with a high pressure pump. The pressure drop in the homogenizer was 35 Bar over each of the two stages, and the output temperature of the process stream was 26.5°-29.5° C.

Variations in product properties obtained by variations of the homogenizer (5) temperature are elaborated upon in example 2 below.

From the homogenizer (5), the product was fed into an ACAC sequence (3) of cooling and working units. The first A-unit (A2) (7) was supplied with liquid ammonia coolant at −6° C. and cooled the process stream to 16°-19° C. The first C-unit (8) could be operated at a rotational speed of between 150-800 rpm without difficulty and a product emerged at a temperature of 20°-25° C.; the degree of heating being determined by the extent of working. The second A-unit (A3) (9) was supplied with liquid ammonia coolant at a temperature of −20° C. and cooled the process stream to a temperature of 14.5° C.

Variations in product properties obtained by variation of the exit temperature of the second A-unit (9) are elaborated upon in example 3 below.

The second C-unit (10) operated at 150 rpm and product emerged from this unit, for packing, at a temperature of 17.5° C. The packing operation was performed on a low shear packing machine (4) so as to avoid overworking the product.

Product properties were measured for a range of samples, manufactured according to the method of the present invention. Typical values are as follows:

| Stevens values | |
|---|---|
| 5° C. | 360–293 |
| 10° C. | 315–217 |
| 15° C. | 107–78 |
| 20° C. | 37–44 |
| 23° C. | 20–13 |
| 25° C. | 13–15 |

The products showed acceptable spreading behavior and excellent second place keepability.

COMPARATIVE EXAMPLE 1

In order to compare the effects of homogenization with non-homogenized products a composition as used in example 1 was processed through a "Votator" sequence of AACAC to produce a spread having as near as possible the same physical characteristics of the spread of example 1. The following results were obtained:

| Stevens values | Example 1 | | Comparison | |
|---|---|---|---|---|
| | (wk 1) | (wk 4) | (wk 1) | (wk 4) |
| 5° C. | 288 | 432 | 331 | 332 |
| 10° C. | 170 | 225 | 202 | 179 |
| 15° C. | 91 | 145 | 127 | 76 |
| 20° C. | 45 | 54 | 49 | 26 |
| 25° C. | 20 | 20 | 22 | 12 |
| D 3,3 | 1.0 | 1.9 | 2.5 | 2.6 |
| Other properties: | (lower scores are better) | | | |
| taste | 6.9 | 6.9 | 6.9 | 7.0 |
| spreading | 1.5 | 1.5 | 2.0 | 2.0 |

It can be seen from these figures that there is significant difference in the products of the present invention and those of the prior art as regards the Stevens values and their variation with time during storage under constant conditions. The taste of the products of the present invention is slightly better on this 1–10 scale.

Turning to second-place keepability, the following results were obtained for a spread prepared according to example 1 as compared with a spread prepared from an identical composition according to a method of the prior art. The examples were repeated with both wrapper margarine fat blends (W) and tub margarine fat blends (T).

| | Example 1 | | Comparative | |
|---|---|---|---|---|
| | (T) | (W) | (T) | (W) |
| Consistency*: | | | | |
| 10° C. | 7.0 | 7.5 | 6.5 | 6.5 |
| 20° C. | 7.0 | 7.5 | 7.0 | 6.5 |
| 25° C. | 6.5 | 6.5 | 5.0 | 6.0 |

-continued

| | Example 1 | | Comparative | |
|---|---|---|---|---|
| | (T) | (W) | (T) | (W) |
| Oil exudation : | 237 | 139 | 246 | 200 |

*measured after repeated temperature cycling from 10° C. to 25° C. over a period of seven days on a scale of 1–10. (Higher scores are better).
measured in mg oil/cm.cm. Lower scores are better.

It can be seen that the products of the present invention exhibit improved second-place keepability, especially when the consistency at higher temperatures is considered.

EXAMPLE 2: HOMOGENIZER TEMPERATURE

Figure 2:
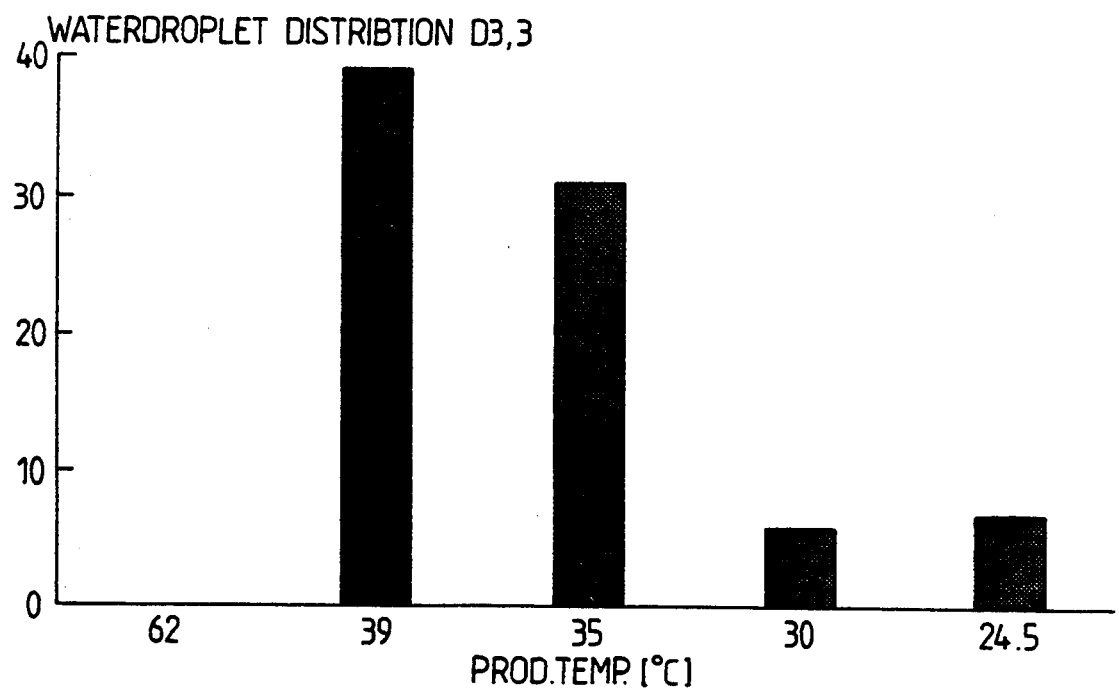
FIG. 2: shows a graph illustrating the effect of variation of homogenizer (5) conditions on drop size in the product.

As mentioned in the preamble, the homogenization temperature had an effect on product properties. FIG. 2 shows the effect of temperature variations on water-drop distribution, with examples of the invention given for temperatures below 35° C. and comparative examples at temperatures above 35° C. At homogenizer (5) temperatures below 35° C. the water droplet size and distribution are acceptable, above this temperature, coarse emulsions were obtained with unacceptable properties.

EXAMPLE 3: THE THIRD A-UNIT EXIT TEMPERATURE

Figure 3:
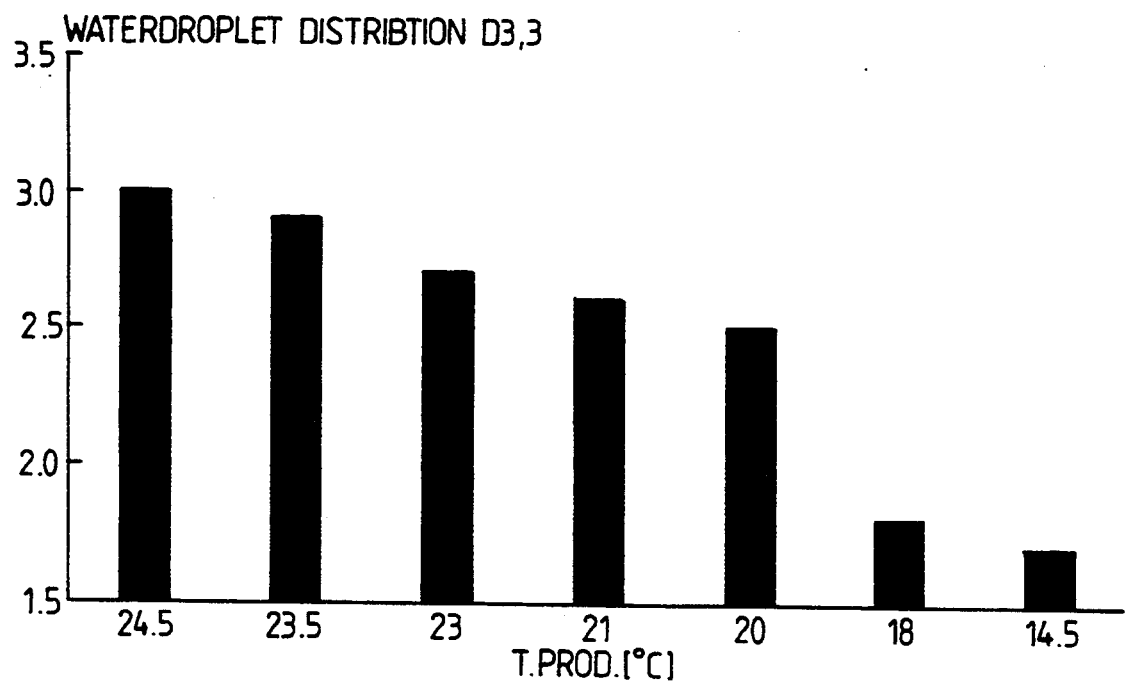
FIG. 3: shows a graph illustrating the effect of variation of the outlet temperature of the A-unit (9) on drop size in the product.

As also mentioned in the preamble, the exit temperature of the A-unit (A3) (9) is to some degree important. FIG. 3 shows the effect of variations in the cooling temperature on the D3,3 of the eventual product. It can be seen from the graph that the D3,3 decreases with the outlet temperature of the A-unit (9).

EXAMPLE 4: ASCORBIC ACID AS ACIDIFYING AGENT

Various modifications may be made within the scope of the present invention. One such modification is the use of ascorbic acid.

In the absence of protein, ascorbic acid can be used as a pH modifying agent. In the presence of protein the buffer capacity of the amino-acid residues is sufficient to prevent reasonable quantities of ascorbic acid having a significant effect on the pH.

EXAMPLE 5: PRODUCTS FREE FROM ADDED EMULSIFIERS

Comparative experiments were performed between products made according to the method of claim 1 with and without emulsifiers, using the following formulations. An attempt was also made to manufacture a spread according to a method of the prior art both with and without an emulsifier. The following results were obtained:

| | Example 5 | Example 1 | Prior Art |
|---|---|---|---|
| Fat Blend | 60% | 59.55% | 59.55% |
| Lecithin | 0 | 0.2% | 0.2% |
| Hymono 7804 | 0 | 0.1% | 0.1% |
| Hymono 8803 | 0 | 0.15% | 0.15% |
| Beta Carotene | 25 ppm | 25 ppm | 25 ppm |
| Water | 39.85% | 39.85% | 39.85% |
| NaCl | 0.15% | 0.15% | 0.15% |
| Flavor | trace | trace | trace |
| Homog. | yes | yes | no |
| Taste | 6.9 | 6.6 | 6.6 |
| Consistency | | | |
| @ 10° C. | 7.5 | 7.5 | 7.5 |
| @ 20° C. | 6.0 | 7.0 | 6.5 |

-continued

|  | Example 5 | Example 1 | Prior Art |
|---|---|---|---|
| @ 25° C. | 4.5 | 5.5 | 5.5 |
| Meltdown | 6.9 | 6.6 | 6.9 |
| D 3,3 | 1.3 | 1.0 | 2.5 |
| Sigma | 2.3 | 2.5 | 1.9 |
| 2 pc* | yes | yes | no |

*2 pc = second place keepability

With the method of the present invention and with the prior art method, emulsifier containing spreads could be made (compare the "Example 1" column and the "Prior Art" column). In this case as with Example 1 the products of the present invention exhibited 'second place keepability' much improved over the prior art.

Despite the attempt being made, it proved impossible to make a product without emulsifiers by the method of the prior art. The emulsion which was produced had large unstable water drops and could not be considered suitable for use as a spread. However, with the method of the present invention a spread could be manufactured without the use of emulsifiers which had properties comparable to those of the prior art product, and in addition exhibited 'second place keepability'.

Microbiological assay after purposeful inoculation of the process stream with either Penicillium spp. and Paecilomyces revealed that the products of the present invention were much less able to support growth of these fat-splitting microbes, than products of the prior art.

EXAMPLE 6: USE OF EMULSIFIER AS AN ANTI-SPATTERING AGENT

A minor drawback of the products of example 5 which contained no emulsifiers was that they exhibited some spattering on use in frying, ejecting hot fat from the pan. On reintroduction of the lecithin (0.2-0.45 wt % native bean-oil lecithin) into the product formulation it was determined that the spattering value could be greatly improved to a value comparable with commercial full fat (80%) spreads. In a representative experiment (example 6) the following composition was employed and the indicated results were obtained (for convenience the data of example 5 and the comparative example are repeated);

|  | Example 5. | Example 6. | Prior Art |
|---|---|---|---|
| Fat Blend | 60% | 59.7% | 59.55% |
| Lecithin | 0 | 0.3% | 0.2% |
| Hymono 7804 | 0 | 0 | 0.1% |
| Hymono 8803 | 0 | 0 | 0.15% |
| Beta Carotene | 25 ppm | 30 ppm | 25 ppm |
| Water | to 100% | to 100% | to 100% |
| NaCl | 0.15% | 0.15% | 0.15% |
| Flavor | trace | trace | trace |
| Homog. | yes | yes | no |
| Taste | 6.9 | 7.0 | 6.6 |
| Consistency |  |  |  |
| @ 10° C. | 7.5 | 6.0 | 7.5 |
| @ 20° C. | 6.0 | 7.5 | 6.5 |
| @ 25° C. | 4.5 | — | 5.5 |
| Meltdown | 6.9 | 7.0 | 6.9 |
| D 3,3 | 1.3 | 2.0 | 2.5 |
| sigma | 2.3 | 2.5 | 1.9 |
| 2 pc* | yes | yes | no |

*2 pc = second place keepability

In addition the consistency, spattering behavior, temperature cycling stability and oil exudation value were determined for the product of Example 6.

Consistency at 10° C. after one week of cycling from 10° C. to 20° C. and back, under two different cycling regimens; 'cycle (A)' and 'cycle (B)' was 6.0. Under identical conditions consistency at 20° C. was 7.5.

Spattering behavior was analysed but in terms of primary spattering (which occurs when a sample of spread is placed in a pan) and secondary spattering (which occurs when water is introduced into hot fat). With the sample of Example 5, both primary and secondary spattering was very noticeable, whereas with the sample of Example 6, spattering was very much reduced and typical of 60% fat spreads.

The extent of oil exudation on storage was quite acceptable.

Representative Stevens (hardness) values were as follows:

| Temp. | Fresh | Cycle(A) | Cycle(B) |
|---|---|---|---|
| 5° C. | 373 | — | — |
| 10° C. | 161 | 113 | 127 |
| 20° C. | 40 | 26 | 35 |
| 23° C. | 26 | — | — |

These values are quite acceptable for an edible spread.

In this instance it is important to note that the lecithin is not required as an emulsifier, as the spreads are stable in the absence of an emulsifier. The lecithin in this instance finds a use as an anti-spattering agent in a spread which is otherwise stable.

We claim:

1. A process for the production of an edible spread which comprises the steps of:
   (a) forming a coarse fat-continuous dispersion of water-in-oil, so as to obtain a fat continuous emulsion comprising a solid fat index of from 0.5 to 2.5 wt. %,
   (b) homogenizing the product of step (a) at a temperature between 20°-35° C. with a homogenizer pressure drop of 20-50 bar, and,
   (c) working and cooling the product of step (b) to obtain an edible emulsion spread which comprises a dispersion of a 15-60% wt. of a water phase in 40-85% wt. of a continuous fat phase wherein the water phase comprises less than 0.05% protein, has a D3,3 of not more than 2.0μ and a sigma value for the water drop size distribution of not more than 2.5.

2. A process according to claim 1 wherein at least part of the cooling step (c) is performed prior to said working, said cooling being at a temperature in the range 18°-20° C.

3. An edible emulsion spread comprising a dispersion of a 15-60% wt. of a water phase in 40-85% wt. of a continuous fat phase wherein the water phase comprises less than 0.05% protein, has a D3,3 not more than 2.0μ and a sigma value for the water drop size distribution of not more than 2.5.

4. A spread according to claim 3, wherein the water phase further comprises a non-proteinaceous emulsifier system.

5. A spread according to claim 4, wherein the emulsifier is selected from the group comprising lecithins, partial glycerides and mixtures of lecithins and partial glycerides.

6. A spread according to claim 5, wherein the emulsifier comprises a mixture of lecithins and monoglycerides.

7. A spread according to claim 6, wherein the emulsifier is present at a concentration of 0.1–1% based on total product.

8. A spread according to claim 3, comprising 0.1–1% lecithin and less than 0.01–1% sodium chloride.

9. A spread according to claim 8, essentially free of monoglyceride.

10. A spread according to claim 8, comprising 50–70% fat phase.

11. A spread comprising 50–60% fat phase, 40–50% water phase, 0.1–1% lecithin, 0.01–1% salt, being essentially free of monoglycerides, proteins and sorbate salts and wherein the water phase has a D3,3 of not more than 2.0μ and a sigma value for the water drop size distribution of not more than 2.5.

12. A spread according to claim 11, wherein the solid fat index at the indicated temperature is N10 25–40, N15 22–30, N20 14–21, N25 8–12, N30<6 and N35<2.

13. An edible emulsion spread comprising a dispersion of a 15–60% wt. of a water phase in 40–85% wt. of a continuous fat phase CHARACTERIZED IN THAT the spread is stable in the absence of emulsifier, and IN THAT the water phase has a D3, 3 not more than 2.0 μm and a sigma value or dropsize standard deviation below 2.

14. An edible emulsion spread according to claim 13, further comprising an emulsifier component as an anti-spattering agent.

15. An edible emulsion spread comprising a dispersion of a 15–60% wt. of a water phase in 40–85% wt. of a continuous fat phase wherein the water phase comprises less than 0.05% protein, has a D 3, 3 not more than 2.0 μm and a sigma value for the water drop size distribution of not more than 2.5; the edible spread produced by:
   (a) forming a coarse fat-continuous dispersion of water-in-oil, so as to obtain a fat continuous emulsion comprising from 0.5 to 2.5 wt. % solid fat index,
   (b) homogenizing the product of step (a) at a temperature of between 20°–35° C. with a homogenizer pressure drop of 20–50 bar and,
   (c) working and cooling the product of step (b) to obtain an edible emulsion spread.

16. A process for the production of an edible spread which comprises the steps of:
   (a) forming a coarse fat-continuous dispersion of water-in-oil, so as to obtain a fat continuous emulsion comprising a solid fat index of from 0.5 to 2.5 wt. %,
   (b) homogenizing the product of step (a) at a temperature between 20°14 35° C. with a homogenizer pressure drop of 20–50 bar and,
   (c) working and cooling the product of step (b) to obtain an edible emulsion spread wherein the water phase comprises less than 0.05% protein, has a D3,3 of not more than 2.0μ and a sigma value for the water drop size distribution of not more than 2.5 and at least part of the cooling step is performed after said working, said cooling being at a temperature below 19° C.

17. A process as claimed in claim 16 wherein at least part of the cooling step (c) is performed after said working, said cooling being in the range 18°–20° C.

18. A process for the production of an edible spread which comprises the steps of:
   (a) forming a coarse fat-continuous dispersion of water-in-oil, so as to obtain a fat continuous emulsion comprising from 0.5 to 2.5 wt. % solid fat,
   (b) homogenizing the product of step (a) at a temperature between 20°–35° C. with a homogenizer pressure drop of 20–50 bar and,
   (c) working and cooling the product of step (b) to obtain an edible emulsion spread having a D3,3 of not more than 2.0μ and a sigma value for the water drop size distribution of not more than 2.5 and wherein the working of step (c) is performed at a Shear equivalent of less than that subsisting in a C-unit operating at 500 rpm.

* * * * *